(12) United States Patent
Rmili et al.

(10) Patent No.: US 11,068,674 B1
(45) Date of Patent: Jul. 20, 2021

(54) RFID TAG IDENTIFICATION METHODS, DEVICES, AND ALGORITHMS BASED ON EIGEN-MODE TECHNIQUE

(71) Applicant: KING ABDULAZIZ UNIVERSITY, Jeddah (SA)

(72) Inventors: Hatem Rmili, Jeddah (SA); Donia Oueslati, Jeddah (SA); Raj Mittra, Jeddah (SA); Yusuf Turki, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/175,904

(22) Filed: Feb. 15, 2021

(51) Int. Cl.
*G06K 7/08* (2006.01)
*G06K 7/10* (2006.01)

(52) U.S. Cl.
CPC ................... *G06K 7/10366* (2013.01)

(58) Field of Classification Search
CPC . H02J 50/12; H02J 7/025; H01Q 1/38; H01Q 1/243; H01Q 1/2225; G06K 7/0008; G06K 19/0723; G06K 19/0701; G06K 19/07749; G01S 17/10
USPC .......... 235/451, 492; 340/10.3, 572.1, 572.4, 340/572.5, 572.7, 700 MS, 872
See application file for complete search history.

(56) References Cited

U.S. PATENT DOCUMENTS

| | | | | |
|---|---|---|---|---|
| 5,955,994 A | * | 9/1999 | Staker | H01Q 21/065 343/700 MS |
| 6,925,701 B2 | * | 8/2005 | Eckstein | G06K 19/0726 174/260 |
| 7,049,933 B1 | * | 5/2006 | Koerner | G06K 7/0008 340/10.1 |
| 2009/0289771 A1 | * | 11/2009 | Tuttle | G06K 7/10346 340/10.3 |

* cited by examiner

*Primary Examiner* — Jamara A Franklin
(74) *Attorney, Agent, or Firm* — W & C IP

(57) ABSTRACT

A character Identification method has been proposed to obtain a specific reaction of a tag inside a printed chipless RFID system on a lossy dielectric substrate. The proposed technique is based on the eigenmode resonance to generate weight excitation coefficients and to extract a desired current distribution induced on the tag illuminated by a transmitter/receiver antennas arrays using the SVD-eigenmodes. The proposed methodology is based on techniques such as the proposed regrouping method to create groups of tags and the correlation method applied between a measure receive signal and the receive signal belong the library (or the create database). This method allows the confirmation/or not of the belonging of the tag to a group and the recognition of the measure tag based on two important parameters: the magnitude and the phase of an identification vector. The CIM method allows the user to better distinguish the tag from others, and to improve the independence from the environment.

6 Claims, 4 Drawing Sheets
(3 of 4 Drawing Sheet(s) Filed in Color)

RFID TAG IDENTIFICATION METHODS, DEVICES, AND ALGORITHMS BASED ON EIGEN-MODE TECHNIQUE

FIELD OF THE INVENTION

The invention is generally related to radio frequency identification (RFID) systems and, more particularly, to a chipless RFID system and methodology for the identification of characters using an approach based on the dominant eigenmodes on the tag that significantly enhances the capability to recognize characters that are special shape, and not just bar codes.

BACKGROUND

RFID is a wireless non-contact technology which uses radio frequency (RF) waves for data transmission between a tag and a reader for automatic identification. RFID has the advantages of being a contactless, low power, and low cost wireless communication technology. RFID has been used for automatic identification in many application areas including without limitation in as asset tracking, security surveillance, etc.

The scattered signal received by an RFID reader includes signals from the chipless RFID tag located in the reader area, as well as reflections from background objects and noise. Therefore the recognition process is a challenging aspect in the design of chipless RFID systems. In many situations, the reflections from background objects are stronger than the tag response. The identification can be performed based on the time-domain or frequency-domain response.

D. Oueslati, R. Mittra, H. Rmili and C. Craeye, "Chipless RFID Tags' Identification Algorithm by Using an Eigenmode Approach Combined with Signal-Processing Technique," 2018 *IEEE International Symposium on Antennas and Propagation & USNC/URSI National Radio Science Meeting*, Boston, Mass., 2018, pp. 1495-1496, describes an identification algorithm of chipless RFID tags by using the eigenmode analysis based on the singular value decomposition, in conjunction with a signal-processing technique. In the process, a dominant eigenmode of the tag is extracted, and the tag is excited with a transmitter antenna array with an excitation coefficient associated to the dominant mode. A signal-processing algorithm is proposed to identify a tag based on the signals received by an array including fields scattered from the direct coupling between the transmitter and the receiver antennas in the presence and in the absence of the tag in the reader area. An identification vector is processed to detect the presence of multiple chipless tags simultaneously with range information and to identify a particular tag. This paper described a chipless RFID tags identification method without presenting a simulation or measured results.

Lucente et al., "The Characteristic Basis Function Method (CBFM): A Numerically Efficient Strategy for Solving Large Electromagnetic Scattering Problems," Turk J Elec Engin, Vol. 16, No. 1, 2008, describe a purportedly numerically efficient strategy for solving large electromagnetic scattering problems. The approach, termed as the Characteristic Basis Function Method (CBFM), is based on utilizing Characteristic Basic Functions (CBFs). CBFs are special functions defined on macro domains (blocks) that include a relatively large number of conventional sub-domains discretized by using triangular or rectangular patches. The CBFs can be derived either analytically from Physical Optics (PO) solutions or by applying the numerical analysis method such as the Method of Moments (MoM). Use of these basis functions purportedly leads to a significant reduction in the number of unknowns and results in a substantial size reduction of the MoM matrix.

Oueslati, Donia. *Modal analysis methods and design of chipless RFID tags with natural fractal shapes.* Published 2019. Retrievable online from dial.uclouvain.be/pr/boreal/object/boreal:184599 describes the synthesis of the electromagnetic signature of fully printed chipless RFID tags based on their eigenmodes. The possibly large interference from the environment and the extraction of rich information from the tag based on its shape is considered the main challenge of the design of the chipless tags. In this thesis, two contributions are presented. First, a design of a chipless tag is proposed based on the experimental characterization of a printed antenna with natural fractal geometry in terms of impedance matching, etc. The complex shape of the tag with a unique electromagnetic signature allows the minimization of the tag's falsification. Second, an eigenmodes approach is proposed to control the current distribution on a scatterer. The technique is based on the Method of Moments (MoM) and on the Singular Value Decomposition (SVD) [WH]. A methodology is developed based on a proposed eigenmodes approach to selectively excite certain modes on the tag using multiple near-field excitation. A beamforming process is also used on receive to realize a selective sensitivity to particular modes. The methodology leads to the extraction of an independent spectral signature for the tag and purportedly to better distinguishing it from its environment. The SVD-Eigenmode method presented in this thesis is based on a combination of the dominant eigenmodes which characterize the chipless tag, the special power of the excitation array (Reader, tags' illumination), and the excitation weight coefficient of each feed.

Rezaiesarlak, Reza. Design and Detection Process in Chipless RFID Systems Based on a Space-Time-Frequency Technique. Virginia Polytechnic Institute and State University. Apr. 27, 2015 describes employing the singularity expansion method (SEM) and the characteristic mode theory (CMT) to provide a systematic design process by which the resonant and radiation characteristics of the tag are monitored in the pole diagram versus structural parameters. By using ultra-wideband (UWB) technology, Rezaiesarlak suggests it is possible to study the time and frequency domain characteristics of the antenna used in chipless RFID system. A time-frequency technique, called short-time matrix pencil method (STMPM), is introduced as an efficient approach for analyzing various scattering mechanisms in chipless RFID tags. By studying the performance of STMPM in early-time and late-time responses of the scatterers, the detection process is purportedly improved in cases of multiple tags located close to each other. A space-time-frequency algorithm is introduced based on STMPM to detect, identify, and localize multiple multi-bit chipless RFID tags in the reader area.

SUMMARY

An object of the invention is to provide an RFID tags identification method based on the powerful eigenmode of the printed tag. The identification approach is developed, optimized, and simulated based on a novel process and an RFID system.

It is an object of some exemplary embodiments to provide an RFID system having chipless passive RFID tags printed on a multilayer dielectric substrate, having an RFID patch printed on a first layer of the substrate and an array of receiving and transmitting dipole antennas printed on a third layer, an RFID reader having an array of transmitting and receiving antennas for illuminating the RFID tag and receiving a signal from the RFID tag in response to radio frequency (RF) illumination of the RFID tag, wherein the RFID reader generates a library of groups of tags based on a resonance frequency of a received signal from the RFID tag, generates a signal matrix (M) for each character's group and identifies a character using an identification vector (ID) using a correlation method where ID is defined as $$ID = Rm \times Minv$$

where Minv is a matrix representing the inverse of M, a receive signal matrix for each character's group, and Rm is the measured received signal of the object.

In some embodiments, a new procedure for analyzing RFID tags is employed which uses an eigenmodes approach to extract the induced currents on the tag and to determine the resonant frequencies of the tag. We proposed a technique named character identification method (CIM). Our approach has been developed and is used to enhance performances of a tag. In the CIM methodology, first the resonance-induced currents on the tag are associated to the dominant eigenmodes by applying the singular value decomposition (SVD) to the Method of Moments (MoM) impedance matrix. Later, a particular weight coefficient is obtained to determine the receive signal from the tag and extract an identification vector (IDv) that provides for accurate recognition of the tag. The invention overcomes the problem that the scattered field from the tag does not provide sufficient information about the resonant behavior of the tag.

Exemplary embodiments determine RFID reader transmission array configurations which achieve the best performance from chipless RFID tags and identify the tags. The technology is well suited for recognizing chipless tags distinguished from one another by shape (e.g., characters).

Completely unknown tags are first cataloged in a library according to the following procedure. For each unknown tag, the Characteristic Basis Function Method is used to determine a method of moments (MoM) impedance matrix for the unknown tag. The singular value decomposition (SVD) technique is then applied to the MoM impedance matrix to find the eigenmodes of the tag. The first eigenmode's (i.e., dominant mode's) associated singular value with respect to frequency is generated next for determining the resonant frequency. The frequency with the singular value closest to zero is the resonant frequency of the dominant mode. Next, scattering matrices are produced by driving the RFID system reader's transmitter at the determined resonant frequency, first with and then without the neighboring presence of the unknown tag. Taking the differences of these two matrices gives a differential scattering matrix. Separately, a weight excitation coefficient vector is determined from the dominant mode. The differential scattering matrix and the weight excitation coefficient vector are then used together to determine a receive signal for the unknown tag. This process is repeated for multiple tags, and those with approximately the same resonant frequency for the dominant mode are treated as groups. For each group a single receive signal matrix M is generated in which the columns represent the respective receive signals. The matrices of multiple groups collectively form a reference library for the system. The tags are now ready to be used.

Equipped with the receive signal matrix M for each group of tags entered in the library, the system can now identify any one of the individual cataloged tags. For a given tag to be identified for which a receive signal is received by the reader, the receive signal of that tag and the receive signal matrices of the library are used to produce an identification vector. The amplitude and phase of the identification vector are used to narrow the possible identities down to a single identity in the catalog.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

The Characteristic Basis Function Method is used to derive characteristic basis functions (CBFs) to represent the induced current on the tag illuminated by an antenna. Advantageously, it is not necessary to determine the excitation weight coefficients of the transmit as well as the receive antenna elements of the reader in a systematic and deterministic manner to achieve the best performance from a given tag. Unfortunately, it is not sufficient to characterize/ or identify the environment tag.

Figure 1:
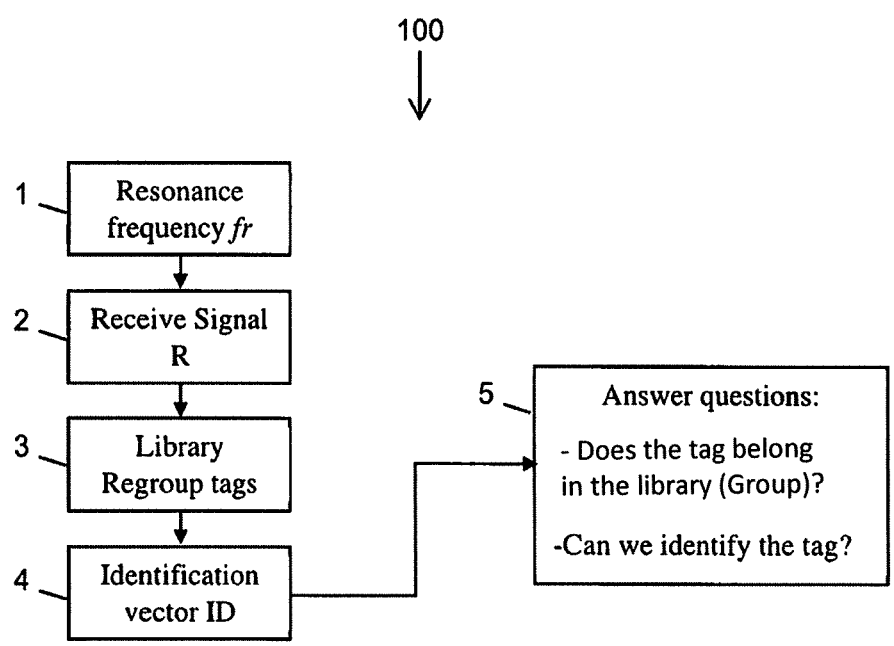
FIG. 1 is a flow chart of an exemplary identification process.

FIG. 1 is a flowchart that presents the most important steps of the characterization/identification approach. The two first steps are operated for all tags individually to generate the electromagnetic response of each tag and collect them in library (as a data base). The $3^{rd}$ step shown in FIG. 1 consist of regroup the tags data in a set of groups according to the chosen dominant eigenmode's resonance frequency. The last step ($4^{th}$ block in FIG. 1) is to generate the identification vector associated with each group and the tag to identify. That is, the Library includes the tags data, which will be presented as a set of groups, and the Library consists of many groups. At the first step we save the tags data in the Library. Later we reorganize the library as a set of a groups, where each group consists of a tags data which have a close resonance frequency.

In general, in an exemplary RFID system, there are one or more (generally a plurality) tags excited by a reader antenna's array. The reader antenna's array serves the dual purpose of transmit and receive for the system. The Receive Signal R is the signal from one tag when the tag is illuminated with the antenna array. One objective is to determine the weight coefficient of the transmitter antennas when operating in the 'transmit' mode. More specifically, an important objective of the proposed method is to determine a distinct weight coefficients of the transmission array elements which is associated to the dominant eigenmode of each tag. The weight coefficients of the transmission array are associated to the dominant eigenmode of each tag. This is why the response of each tag is unique in terms of electromagnetic signal. The dominant eigenmode can be the first of the second eigenmode on the tag. Using the eigenmodes approach, the current induced on a tag being close to a desired 'modal' distribution can be ascertained and this is related to a particular power in the feed of each transmitter antenna.

The relevant steps of the character identification method (CIM) process are outlined below:

Extract the current distribution on a tag in terms of the eigenmodes: The singular value decomposition (SVD) [WH] and the Method od Moment (MoM) are used to extract the current distribution of eigenmodes on the tag. This method is also used in [OD] to obtain the current distribution of the dominant eigenmodes on the tag. This technique is based on the singular value decomposition of the MoM impedance matrix (Z) to derive a diagonal matrix $\Sigma$, with orthogonal matrices U and V as pre- and post-multipliers of $\Sigma$. The factorized Z matrix is written as:

$$Z=U\Sigma V^H \quad (1)$$

where, $\Sigma$ is a diagonal matrix whose diagonal elements consist of real and non-negligible singular values, U and V are orthogonal matrices of singular vectors. The Columns of V represent the eigenmodes $J_m$.

Determine whether a dominant mode of each tag is at resonance: generate its associated singular value with respect to frequency and check the singular value is close to zero near a specific frequency ($f_r$) (FIG. 1 block 1).

Generate the scattering matrix (Sc) from the direct coupling between the transmitter and the receiver antennas at the resonance frequency fr.

Extract the differential scattering matrix Scd at fr:

$$Scd=Sc-Scw \quad (2)$$

where Sc is the scattering matrix in the presence of the character and Scw is the scattering matrix in the absence of the character.

Extract the weight excitation coefficient vector (Tc) at fr based on the currents (I) induced on the character by the reader antenna array and the desired current distribution associated to the first dominant eigenmode ($G_m$). Tc associated to the dominant eigenmode is obtained using the least squares method:

$$I \times Tc = G_m \quad (3)$$

Generate a receive signal R from the character (FIG. 1 block 2):

$$R=Tc^T \times Scd \quad (4)$$

where $^T$ is the transpose of vector Tc.

The next steps are a post signal processing after carried out after the receive signal from each tag (it can be from the simulation or the measurement of the system). By the time of these steps, receive signals of a set of tags are already generated.

Generate the library (FIG. 1, block 3; The library consists of a set of tags data. (it is similar to a data base) each Receive signal from a tag must be saved in the library.

In this embodiment, the receive signal must be repeated every time a tag is in the environment. Thus, the steps lead to generate the R must be also repeated.

Create a set of tags' groups based on their resonance frequency fr. Each group consist of a set of tags have nearby resonance frequencies. The band frequency of each group can be around 0.1 Ghz. That is, each tag has its own resonance frequency. The size of the groups is dependent on the tags which have a nearby resonance frequency.

Generate a receive signal matrix (M) for each group. The columns of M represent the receive signal R.

Identification of the character: The last step for the proposed identification method is obtain the identification vector (ID) using a correlation method. ID is defined as $$ID=R_m \times M_{inv} \quad (5)$$

where $M_{inv}$ is a matrix that represents the inverse of M using the usual inversion method [AG] if the matrix M is a square matrix, otherwise the pseudo-inverse method [AG] can be used to invert the rectangular matrix M. The vector $R_m$ is the measure receive signal of the object.

The tag can be recognized from the amplitude and the phase of ID: when an element of the magnitude vector and the phase vector of ID is close to one and zero respectively. Its position (the row) represents the tag's number inside a group, then the measured tag is recognized.

Numerical results are presented herein after a simulation using the CIM technique described above to generate the identification vector. CIM is applied to a printed system by using the example presented in [OD] with more transmitter and receiver antennas.

Figure 2A:
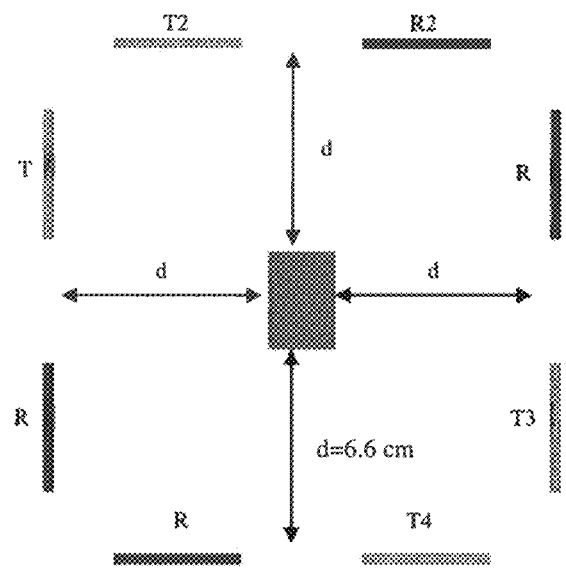
FIG. 2a is a top view of an exemplary chipless passive RFID system printed on a multilayered lossy dielectric substrate.
Figure 2B:
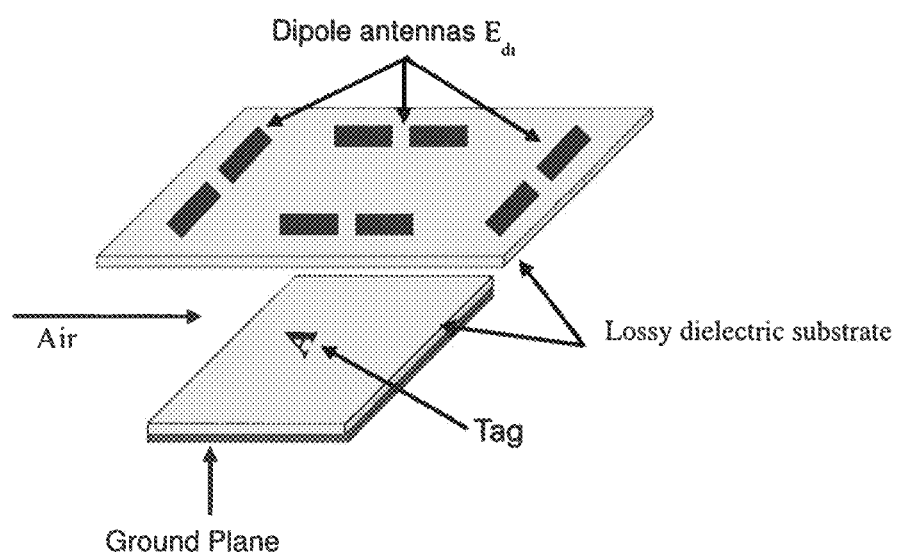
FIG. 2b is a side view of the system from FIG. 2a. The patch is printed on a first layer and dipoles are printed on a third layer.
Figure 3A:
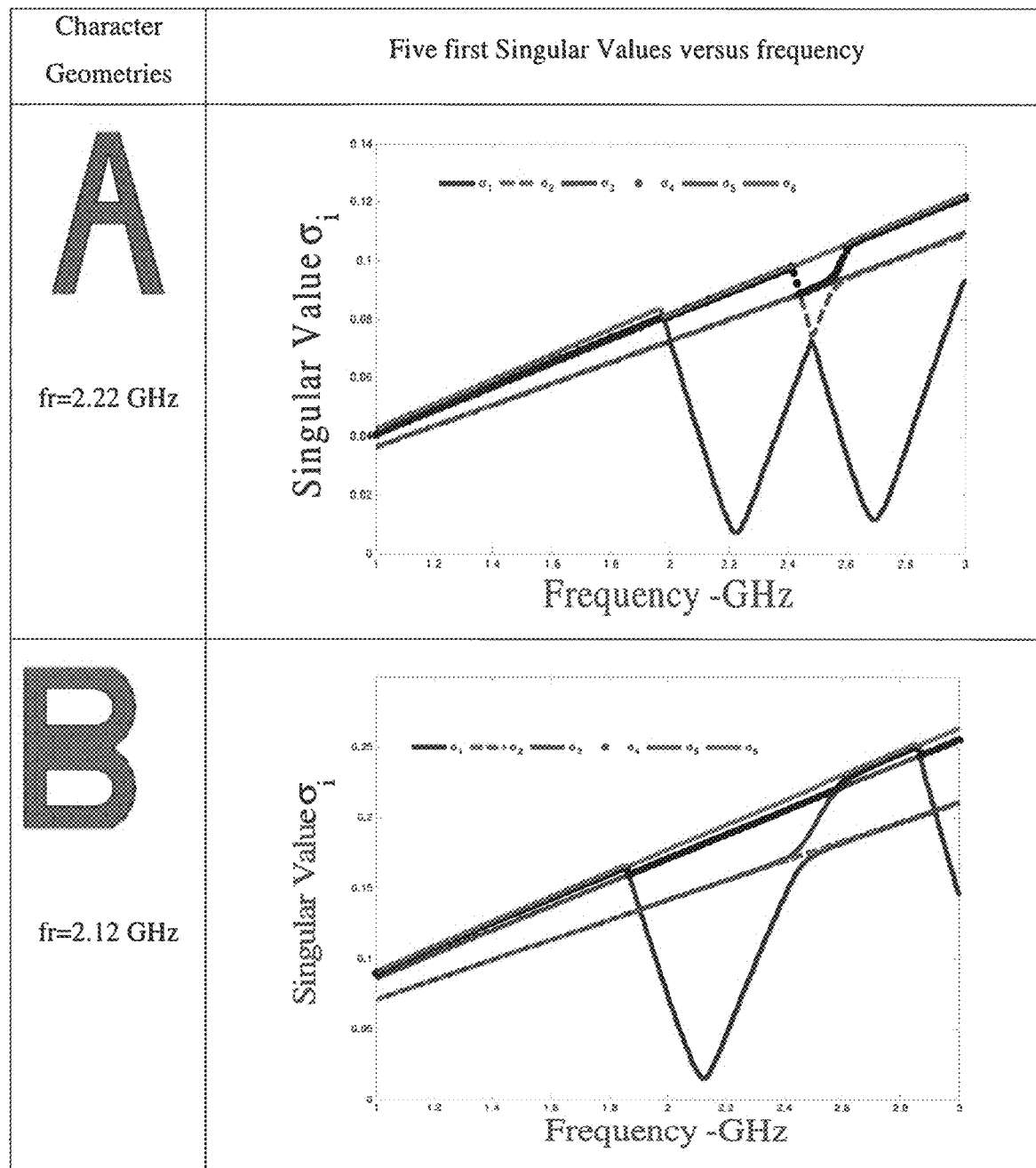
FIGS. 3a-b are graphs showing, for four different letters in the Latin alphabet, the singular values of each tag vs. frequency to obtain the eigenmode resonance (fr).
Figure 3B:
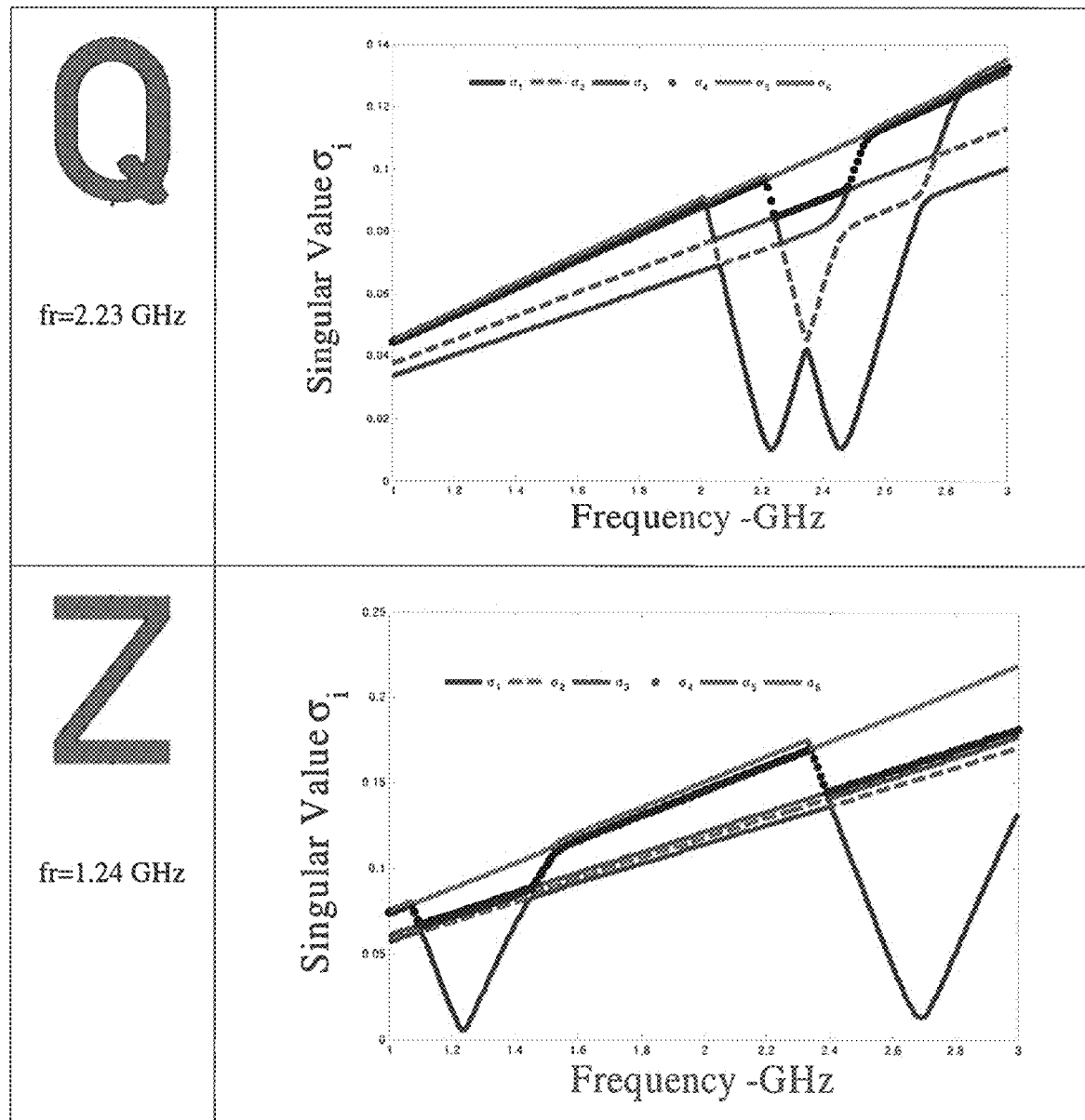

Considering the example of a near field RFID system (shown by example in FIGS. 2a-b), comprising a tag printed on a lossy dielectric substrate backed by a ground plane at the first layer, with a reader that has 8 antennas located above the tag, with a vertical distance equal to 3 cm. FIGS. 2a-b illustrate the geometry of the set-up with an example of a reader consists of 8 antennas printed on a lossy dielectric substrate. The RFID system investigated is comprised of two dielectric layers with an air gap, with the tag printed on the first layer and the antennas reader printed on the second. The validation of the methodology is presented here using different characters (see tabular information in FIGS. 3a-b) based on the Latin alphabet shape of size 2×2.9 cm.

In practice, to develop a library of tags' data, for exemplary purposes, we simulated 26 tags based on the Latin alphabet and we extract their one resonance frequency according to the first dominant eigenmode of the tag. The classification of the tags is based on the fr to create a tags' group. The range of the resonance frequency inside one group is chosen around 0.1 GHz. Table 1 presents the regrouping tag with the range frequency related to the 7 obtained groups.

TABLE 1

| Groups of Tags and Related Information | | | | | | | |
|---|---|---|---|---|---|---|---|
| Groups' Number | Tags | | | | | Range frequency (GHz) | Center frequency fc (GHz) |
| 1 | Geometry | G | W | Z | U | [1.21-1.26] | 1.235 |
|   | fr (GHz) | 1.21 | 1.22 | 1.23 | 1.26 |   |   |

TABLE 1-continued

Groups of Tags and Related Information

| Groups' Number | | Tags | | | | | Range frequency (GHz) | Center frequency fc (GHz) |
|---|---|---|---|---|---|---|---|---|
| 2 | Geometry | E | S | | C | V | [1.38-1.49] | 1.42 |
|   | fr (GHz) | 1.38 | 1.39 | | 1.4 | 1.49 | | |
| 3 | Geometry | I | H | N | M | F | [1.52-1.66] | 1.59 |
|   | fr (GHz) | 1.52 | 1.58 | 1.63 | 1.65 | 1.66 | | |
| 4 | Geometry | L | | J | | R | [1.825-1.93] | 1.88 |
|   | fr (GHz) | 1.825 | | 1.88 | | 1.93 | | |
| 5 | Geometry | T | | | K | | [2.01-2.05] | 2.03 |
|   | fr (GHz) | 2.01 | | | 2.05 | | | |
| 6 | Geometry | B | P | | Y | X | [2.12-2.19] | 2.15 |
|   | fr (GHz) | 2.12 | 2.13 | | 2.17 | 2.19 | | |
| 7 | Geometry | D | A | | Q | O | [2.21-2.25] | 2.23 |
|   | fr (GHz) | 2.21 | 2.22 | | 2.23 | 2.25 | | |

The identification of the tag is based on the ID vector (eq.5) as defined above. The M matrix is also generated for each group with different size. To validate the CIM approach, we suppose herein that the measure receive signal $R_m$ is equal to the receive signal obtained from the B tag (the measured tag and the tag to identify, as an example). As an ideal case, the matrix M (4×4) related to the sixth group is used to calculate the ID vector.

Table 2 shows the magnitudes and the phases of the first element of ID are equal to '1' and '0' respectively, then the measured tag belongs to the group number 6 and the measured receive signal correlates with the signal received by the first tag inside the group, namely the B tag.

TABLE 2

Simulated Results

| ID = $R_m * M_6$ | \|ID\| | Phase of ID (degree) |
|---|---|---|
| $\begin{bmatrix} 3.34 - 1.62i \\ 0.11 + 0.24i \\ 0.19 + 0.06i \\ -3.94 + 0.56i \end{bmatrix}$ | $\begin{bmatrix} 1 \\ 0 \\ 0 \\ 0 \end{bmatrix}$ | $\begin{bmatrix} 0 \\ -122.27 \\ -170.13 \\ -15.21 \end{bmatrix}$ |

Table 2 shows that the magnitudes and phases of the first element of ID vector are equal (or close) to '1' and '0', respectively, both under ideal conditions as well as in the presence of background noise, demonstrating that the B tag can be identified even in presence of a noise. The CIM method can be used at different measurement scenarios based on a special optimization of the identification numerical method.

The measured receiver signal Rm is obtained at the frequency f in different cases:

Rm=R at the idea condition (R is the measure receive signal at the resonance frequency of the tag)

Rm=R+N, in presence of a noise (with N is a noise added to the simulated receiver signal; N can be equal to 1%, 2% or 5% of R)

Rm=$R_f$ at a choice frequency f ($R_f$ is a receiver signal at a frequency close to the resonance frequency of the tag structure)

Rm=$R_{sh}$ ($R_{sh}$ is a receiver signal of a shifted tag's position at its resonance frequency $f_r$)

Rm=$R_{shf}$ (with $R_{shf}$ is a receiver signal of a shifted tag at a frequency f close to the resonance frequency)

REFERENCES

[OD] O. Donia, "Modal analysis methods and design of chipless RFID tags with natural fractal shapes," Ph.D. dissertation, Université Catholique de Louvain la Neuve, February 2017

[WH] W.H. Press, S. A. Teukolsky, W. T. Vetterling, and B. P. Flannery, "Numerical recipes inc." Cambridge University Press, U. K., 1992.

[AG] Alexander Graham, Matrix Theory and Applications for Scientists and Engineers, Dover Publications; Unabridged, July 2018.

What is claimed is:

1. A method of radio frequency identification (RFID) tag identification, comprising for each tag of a plurality of chipless RFID tags, determining a resonant frequency of a dominant mode of a chipless RFID tag;

organizing the plurality of chipless RFID tags into a plurality of groups based on the resonance frequencies of the tags, each group containing only tags which have resonant frequencies within a predetermined range, each group corresponding to a different range;

for each group of the plurality of the groups, generating a receive signal matrix in which columns represent respective receive signals of the tags within the group;

for a tag-to-be-identified,
producing identification vectors from the receive signal matrices; and
identifying the tag-to-be-identified using the amplitudes and phases of the identification vectors.

2. The method of claim 1 wherein the step of determining comprising:

generating for each tag an associated singular value with respect to resonant frequency; and checking that a singular value is close to zero near a specific frequency.

3. The method of claim 1 wherein the step of organizing comprises generating a scattering matrix (Sc) from direct coupling between the transmitter and the receiver antennas at a resonance frequency fr;

extracting a differential scattering matrix Scd at fr according to the equation $Scd = Sc - Scw$ where Sc is a scattering matrix in the presence of a character of the RFID tag and Scw is the scattering matrix in the absence of the character of the RFID tag;

extracting a weight excitation coefficient vector (Tc) at fr based on currents (I) induced on the character of the RFID tag by the antenna array of the RFID reader and a specified current distribution associated with a first dominant eigenmode ($G_m$), where Tc is associated with the dominant eigenmode is obtained using a least squares method according to the equation $I \times Tc = G_m;$ generating a receive signal R from the character on the RFID tag according to the equation $R = Tc^T \times Scd$ where $^T$ is the transpose of vector $Tc$;

grouping sets of RFID tags which have nearby frequencies; and generating a receive signal matrix (M) for each character's group, wherein columns of M represent the receive signal R.

4. The method of claim 1 wherein the identifying the tag-to-be-identified is performed by obtaining an identification vector (ID) using a correlation method where $ID = R_m \times M_{inv}$ where $M_{inv}$ is a matrix that represents the inverse of M, and where vector $R_m$ is the measure receive signal of the character on the RFID tag.

5. The method of claim 1 wherein the determining the resonant frequency of the dominant mode of the tag is performed using using an RFID reader having transmitter and reader antennas positioned on a substrate spaced above the RFID tags.

6. A radio frequency identification (RFID) system, comprising:

a chipless passive RFID tag printed on a multilayer dielectric substrate having an RFID patch printed on one layer of the substrate and an array of transmitting and receiving dipole antennas printed on another layer;

an RFID reader having an array of transmitting and receiving antennas for illuminating the RFID tag and receiving a signal from the RFID tag in response to radio frequency (RF) illumination of the RFID tag, wherein the RFID reader generates a library of groups of tags based on a resonant frequency of a received signal from the RFID tag, generates a signal matrix (M) for each character's group and identifies a character using an identification vector (ID) using a correlation method where ID is defined as $ID = Rm \times M\text{inv}$ wherein Minv is a matrix representing the inverse of M, a receive signal matrix for each character's group, and Rm is the measured received signal of the object.

* * * * *